(12) United States Patent
Cordaro

(10) Patent No.: US 8,038,910 B2
(45) Date of Patent: Oct. 18, 2011

(54) LOW SOLAR ABSORPTANCE, HIGH EMISSIVITY, INORGANIC ELECTROSTATIC DISSIPATIVE THERMAL CONTROL COATING

(75) Inventor: James F. Cordaro, Ridgecrest, CA (US)

(73) Assignee: The Boeing Company, Chicago, IL (US)

( * ) Notice: Subject to any disclaimer, the term of this patent is extended or adjusted under 35 U.S.C. 154(b) by 707 days.

(21) Appl. No.: 12/116,331

(22) Filed: May 7, 2008

(65) Prior Publication Data
US 2009/0280260 A1 Nov. 12, 2009

(51) Int. Cl.
*H01B 1/08* (2006.01)
*H01B 1/20* (2006.01)
*B05D 5/12* (2006.01)

(52) U.S. Cl. .................. 252/519.51; 427/58; 244/159.1

(58) Field of Classification Search ............ 252/519.51; 423/155; 427/58; 244/159.1
See application file for complete search history.

(56) References Cited

U.S. PATENT DOCUMENTS

| | | | |
|---|---|---|---|
| 3,711,397 A * | 1/1973 | Martinsons | 205/474 |
| 5,807,909 A | 9/1998 | Cordaro et al. | |
| 5,820,669 A | 10/1998 | Cordaro | |
| 6,080,232 A * | 6/2000 | Sperlich et al. | 106/436 |
| 6,099,637 A * | 8/2000 | Cordaro | 106/635 |
| 6,124,378 A | 9/2000 | Cordaro et al. | |
| 6,576,290 B2 | 6/2003 | Cordaro et al. | |
| 6,917,347 B2 | 7/2005 | Long et al. | |
| 2002/0168474 A1* | 11/2002 | Cordaro et al. | 427/385.5 |

* cited by examiner

*Primary Examiner* — Mark Kopec
(74) *Attorney, Agent, or Firm* — McNees Wallace & Nurick LLC

(57) ABSTRACT

An electrostatic dissipative paint having a pigment. The pigment includes a composition according to the following formula:

$$(Mg_{1-x}Zn_x)Ga_{2+y}O_{4-\delta}$$

wherein the value of x is a value from about 0 to 1, y is a value from about 0 to 0.04 and $\delta$ is in the range of about 0 to about 0.03. An electrostatic dissipative coating system, a method for making an electrostatic dissipative coating, and a method for protecting a spacecraft is also disclosed.

19 Claims, 2 Drawing Sheets

LOW SOLAR ABSORPTANCE, HIGH EMISSIVITY, INORGANIC ELECTROSTATIC DISSIPATIVE THERMAL CONTROL COATING

FIELD OF THE DISCLOSURE

The present disclosure is directed to thermal control coatings and coating composition, and, more particularly, to a white paint useful for coating spacecraft and components of spacecraft.

BACKGROUND

Spacecraft are subjected to a wide range of thermal environments during service. For example, one side of the spacecraft may face in a direction away from the sun, while another side faces toward the sun. Thermal control is desirable because heat is radiated into space, which cools the spacecraft, but the spacecraft can simultaneously be heated intensively in direct sunlight.

Active and passive temperature control techniques are used to maintain the interior temperature of the spacecraft, which contains persons or sensitive instruments, within acceptable operating limits. Active temperature control may involve machinery or electrical devices, such as electrical heaters, electrical coolers, and heat pipes. In contrast, passive temperature controls are techniques that do not involve machinery or electrical devices, but may include thermal coatings or structural designs.

Specifically, one known approach to passive temperature control includes use of surface coatings, typically termed "paints", on the external surface of the spacecraft. A white paint, for example, has a low solar absorptance, while a black paint has a high solar absorptance. Selective application of such paints to various elements of the spacecraft exterior greatly aids in controlling its temperature.

In addition to passive temperature control, it is desirable for paint applied to the surface of spacecraft to dissipate electrostatic charges (i.e., provide electrostatic dissipation (ESD)) that may develop along the external surface of the spacecraft. The electrostatic charges may accumulate and cause arcing and possible damage to, or interference with, sensitive electronic equipment on or in the spacecraft. In order to dissipate electrostatic charge, the paint must have at least some electrical conductivity. Specifically, it is desirable that coatings capable of electrostatic dissipation (ESD) have a surface resistivity of less than about $10^9$ ohms per square.

In addition to thermal control and ESD, paint for use on spacecraft and spacecraft components should exhibit additional characteristics for spacecraft applications. For example, the paint should be stable during long-term service in a space environment. The paint is desirably moderately tough and flexible so that it does not crack and flake away as it is flexed due to mechanical or thermal strains.

A number of white, electrostatic-dissipative paints are known for spacecraft use. One of the known paints includes an inorganic potassium silicate binder. The paint having the potassium silicate binder typically has a solar absorptance of from about 0.13 to about 0.15, see U.S. Pat. No. 5,094,693, whose disclosure is incorporated by reference in its entirety. However, it is desirable to have paints with lower solar absorptance. The lower the value of the solar absorptance, the lower the heating of the paint and thence the underlying substrate, in the intense heating of direct sunlight.

Known white thermal paints have high production costs. For example, doping of materials involves labor-intensive and expensive processes and expensive materials.

What is needed is an improved white thermal-control paint that is operable and stable in a space environment, which has a lower solar absorptance than available in existing paints, which has a lower operating temperature-limit than existing paints, which can manage electrostatic discharge (ESD) and can be manufactured inexpensively. In addition, it is desired to have an inorganic white thermal control coating which; a) minimizes space radiation degradation over time, b) minimizes the beginning of life (BOL) and the end of life (EOL) solar absorptance (α), c) maximizes the infrared emissivity (e), while at the same time d) maximizing the electrostatic dissipative (ESD) properties at low temperatures (below −65° C.). The present disclosure fulfills this need, and further provides related advantages.

SUMMARY

One aspect of the present disclosure is an electrostatic dissipative paint having a pigment. The pigment includes a composition according to the following formula:

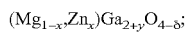
$$(Mg_{1-x},Zn_x)Ga_{2+y}O_{4-\delta};$$

wherein the value of x is a value from about 0 to 1 or from about 0.01 to about 0.75 or from about 0.45 to about 0.55, y is a value from about 0 to 0.04 or from about 0 to about 0.02 or from about 0 to about 0.01 and δ is in the range of about 0 to about 0.03 or from greater than 0 to about 0.01 or from greater than 0 to about 0.005.

Another aspect of the present disclosure is an electrostatic dissipative coating system. The coating system includes a cured binder and a plurality of particles incorporated into the binder having a composition according to the following formula:

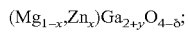
$$(Mg_{1-x},Zn_x)Ga_{2+y}O_{4-\delta};$$

wherein the value of x is a value from about 0 to 1 or from about 0.01 to about 0.75 or from about 0.45 to about 0.55, y is a value from about 0 to 0.04 or from about 0 to about 0.02 or from about 0 to about 0.01 and δ is in the range of about 0 to about 0.03 or from greater than 0 to about 0.01 or from greater than 0 to about 0.005.

Still another aspect of the present disclosure is a method for making a thermal paint. The method includes providing gallium oxide powder, a magnesium oxide powder and a zinc oxide powder. The gallium oxide powder, magnesium oxide powder and zinc oxide powder are mixed together. The mixture is then calcined at an elevated temperature for a sufficient time to produce a pigment having the spinel structure having the following formula:

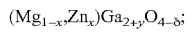
$$(Mg_{1-x},Zn_x)Ga_{2+y}O_{4-\delta};$$

wherein the value of x is a value from about 0 to 1 or from about 0.01 to about 0.75 or from about 0.45 to about 0.55, y is a value from about 0 to 0.04 or from about 0 to about 0.02 or from about 0 to about 0.01 and δ is in the range of about 0 to about 0.03 or from greater than 0 to about 0.01 or from greater than 0 to about 0.005. The calcined powder is optionally annealing at 800° C. in an atmosphere of 10 vol % hydrogen with balance argon. The pigment is incorporated into a binder to form a paint.

Still another aspect of the present disclosure is a method for protecting a spacecraft. The method includes providing a spacecraft component and applying a coating to a surface of the component. The coating contains a pigment comprising a composition according to the following formula:

$(Mg_{1-x}Zn_x)Ga_{2+y}O_{4-\delta}$;

wherein the value of x is a value from about 0 to 1 or from about 0.01 to about 0.75 or from about 0.45 to about 0.55, y is a value from about 0 to 0.04 or from about 0 to about 0.02 or from about 0 to about 0.01 and δ is in the range of about 0 to about 0.03 or from greater than 0 to about 0.01 or from greater than 0 to about 0.005.

One advantage includes reduced production costs in comparison to known white thermal paints utilizing doped materials.

The paint will help provide longer spacecraft lifetimes and increased power usage for enhanced communications capabilities. In addition, the improved physical properties of this thermal control paint should lead to improved designs, increased lifetime, and increased power usage abilities of spacecraft, including, but not limited to satellites.

Another advantage is that the pigment is self-doping and electrically conductive, wherein time-consuming and labor-intensive doping of the material followed by expensive precision elemental analyses is not required.

Another advantage is that the pigment according to certain embodiments provide electrostatic dissipate (ESD) properties to low temperatures, including temperatures as low as −170° C.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION

Figure 1:
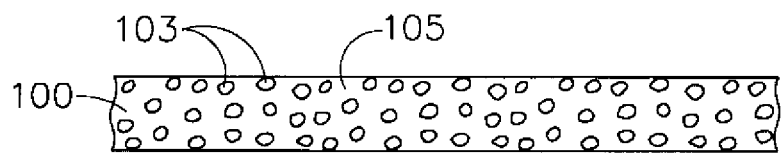
FIG. 1 is a side elevational view of a paint layer according to an embodiment of the disclosure.

The present disclosure includes paints and coating systems incorporating an electrically conductive pigment. The pigment is made up of particles having spinel structure of gallium magnesium zinc oxide or magnesium zinc gallate according to the following formula:

$(Mg_{1-x}Zn_x)Ga_{2+y}O_{4-\delta}$;

wherein the value of x is a value from about 0 to 1 or from about 0.01 to about 0.75 or from about 0.45 to about 0.55, y is a value from about 0 to 0.04 or from about 0 to about 0.02 or from about 0 to about 0.01 and δ is in the range of about 0 to about 0.03 or from greater than 0 to about 0.01 or from greater than 0 to about 0.005.

The term "spinel" as used herein includes spinel structures arranged in a face center cubic lattice, wherein the spinel generally follows the following formula $(A)[B]_2O_4$. In the "normal" spinel arrangement of atoms, the A includes one or more divalent cations that occupy tetrahedral sites and the B includes one or more trivalent cations that occupy the octahedral sites. In the "inverse" spinel arrangement of atoms, the A includes one or more atoms that occupy the octahedral sites one-half of the B atoms occupy the tetrahedral sites and the other half of the B atoms occupy the octahedral sites. More specifically, "normal" generally follows the following formula:

"normal"$=(A)[B_2]O_4$

Likewise, "inverse" generally follows the following formula:

"inverse"$=(A,B)[B]O_4$

In both of the above, A is the divalent cation and ( ) represents the tetrahedral crystal sites. B is the trivalent cation and [ ] represents the octahedral crystal sites. While not wishing to be bound by theory, it is believed that the formula $(Mg_{1-x}, Zn_x)Ga_{2+y}O_{4-\delta}$ includes both the normal and inverse structures. This is known as a "mixed" spinel arrangement of cations. Alternatively, the spinel arrangement may be a nearly inverse arrangement of cations.

The pigment according to certain embodiments of the disclosure include non-stoichiometric solid solutions of gallium magnesium zinc oxide $(Mg_{1-x}Zn_x)Ga_{2+y}O_{4-\delta}$ having slight stoichiometric excess of gallium oxide. While not wishing to be bound by theory, the electrical conductivity of the pigment material is believed to be a result of excess stoichiometric gallium or stoichiometric deficiency of magnesium and/or zinc present in the spinel structure. It is further believed that at least some portion of a rare valence state of Ga2+ cations occupy both the octahedral sites and the tetrahedral sites permitting the exchange of electrons from the $Ga^{2+}$ to the $Ga^{3+}$ cations on both the tetrahedral and octahedral sublattices. The excess gallium (i.e., gallium oxide) in the spinel structure affects an essentially self-doping material, which results in electrical conductivity. The electrical conductivity makes the pigment suitable for use in applications, such as electrostatic dissipation (ESD), which require electrical conductivity.

The inverse or mixed cation distribution, unpaired electrons on the tetrahedral ( ) sites are believed to be spin-paired oppositely with unpaired electrons on the octahedral [ ] sites, for identical atoms. This opposite spin pairing is called a negative exchange interaction. The spin-pairing occurs through a quantum mechanical exchange interaction with neighboring oxygen O atoms. It is known as an indirect exchange or a "superexchange." While not wishing to be bound by theory, electrical conduction on the tetrahedral sub-lattice by transfer of an electron from site 1 to site 2 may be provided by the following formula:

$$(Ga^{2+})_1 + (Ga^{3+})_2 \longrightarrow (Ga^{3+})_1 + (Ga^{2+})_2$$
$$[\text{site 1}] \qquad\qquad [\text{site 2}]$$

Electrical conduction on the octahedral sub-lattice by transfer of an electron from site 1 to site 2 may be provided by the following formula:

$$[Ga^{2+}]_1 + [Ga^{3+}]_2 \longrightarrow [Ga^{3+}]_1 + [Ga^{2+}]_2$$
$$[\text{site 1}] \qquad\qquad [\text{site 2}]$$

It is believe that the magnesium cation $Mg^{2+}$ does not participate in the conduction process. These conduction electrons on the tetrahedral $(Ga^{2+})_n$ and on the octahedral $[Ga^{2+}]_n$ sites should oppositely pair at the Curie temperature. Curie temperatures for exemplary materials include temperature low temperatures including temperatures as low as about 63 K (−210° C.) or lower.

FIG. 1 illustrates a paint layer 100 prepared according to the disclosure. The paint layer 100 comprises particles 103 mixed with a binder 105. The particles include pigment, and, optionally, active secondary particles and/or inert secondary particles. Prior to drying and/or curing, a paint vehicle is also present, but the paint vehicle is volatilized during the drying/curing operation.

Figure 2:
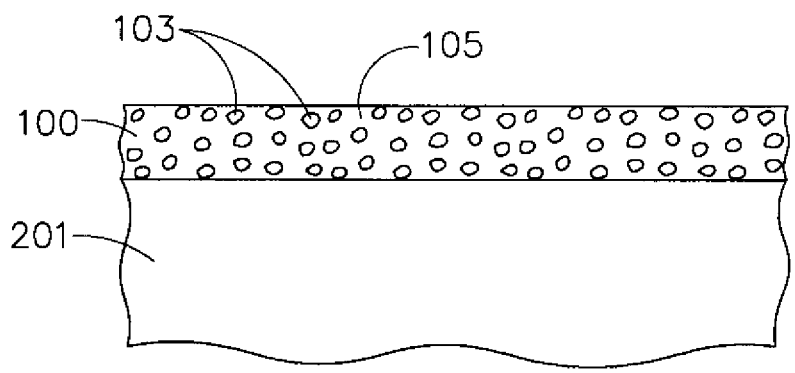
FIG. 2 is a side elevational view of a paint layer applied to a substrate according to an embodiment of the present disclosure.

FIG. 2 illustrates the paint layer 100 applied to a substrate 201. The paint of the present disclosure may be utilized on a variety of substrates. Suitable substrates include metallic substrates comprising aluminum, aluminum alloys, titanium, titanium alloys, nonmetallic materials and composites such as graphite/epoxy and graphite/polycyanate ester composites. In particular, the paint of the present disclosure is suitable for use upon spacecraft, such as satellite radiator coatings, microwave antenna coatings, and sun-shields.

Figure 3:
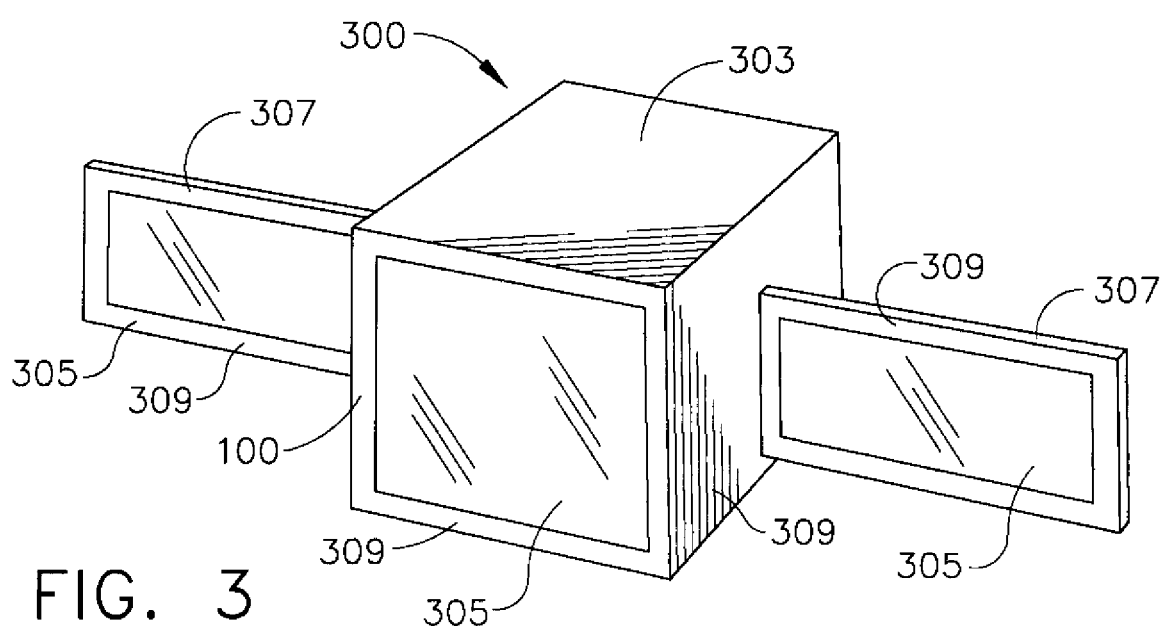
FIG. 3 is a perspective view of a spacecraft having a paint layer according to the disclosure.

The paint of the disclosure may be used in any thermal control application. In one embodiment, the paint is used as a coating on a spacecraft 300, such as a satellite illustrated in FIG. 3. The spacecraft 300, here depicted as a communications satellite that is positioned in geosynchronous orbit when in service, has a body 303 with solar panels 305 mounted either on the body 303 or on wings 307 that extend outwardly from the body 303, or both. The body 303 and wings 307 have a skin 309 which may be made of a metal, a nonmetal, or a composite material, and which may be supported by an underlying skeletal structure. At least some of those outwardly facing portions of the skin 309 of the body 303 and/or the wings 307, which may or may not comprise solar panels are covered with the layer 100 of the paint of the disclosure, as described above. The skin of the spacecraft thereby serves as the substrate 201 to which the paint layer 100 is applied. The paint layer 100 provides the covered portions with passive thermal control and electrostatic charge dissipation capabilities. The paint is sufficiently durable and stable in its properties for use on extended missions of 15 years or more.

To form the paint according to embodiments of the disclosure, the pigment is mixed with a suitable binder. Binders useful for forming paint according to an embodiment of the disclosure include inorganic binders. Examples of suitable binders include, but are not limited to potassium silicate solution (e.g., KASIL® 2135). KASIL® is a federally registered trademark of PQ Corporation, Valley Forge, Pa. Other suitable inorganic binders may also include sodium-potassium silicates, lithium-potassium silicates, lithium-sodium silicates or combinations thereof. The pigment to binder ratio (PBR) may include ratios of about 3.5 to 1 or from about 2.5 to 1 to about 4.0 to 1.

The pigment is formed from calcining gallium oxide, magnesium oxide and zinc oxide powder with an excess of gallium oxide, for example, at 1100° C. in an atmosphere of, for example, 10 vol % hydrogen with balance argon to form a spinel structure and subsequently annealing the material, for example, at 800° C. in an atmosphere of, for example, 10 vol % hydrogen with balance argon. "Calcining", and grammatical variations thereof, as utilized herein, are high temperature processes applied to a solid material in order to bring about a thermal decomposition, and/or phase transition, wherein the conditions are such that a solid solution spinel structure is formed.

Figure 4:
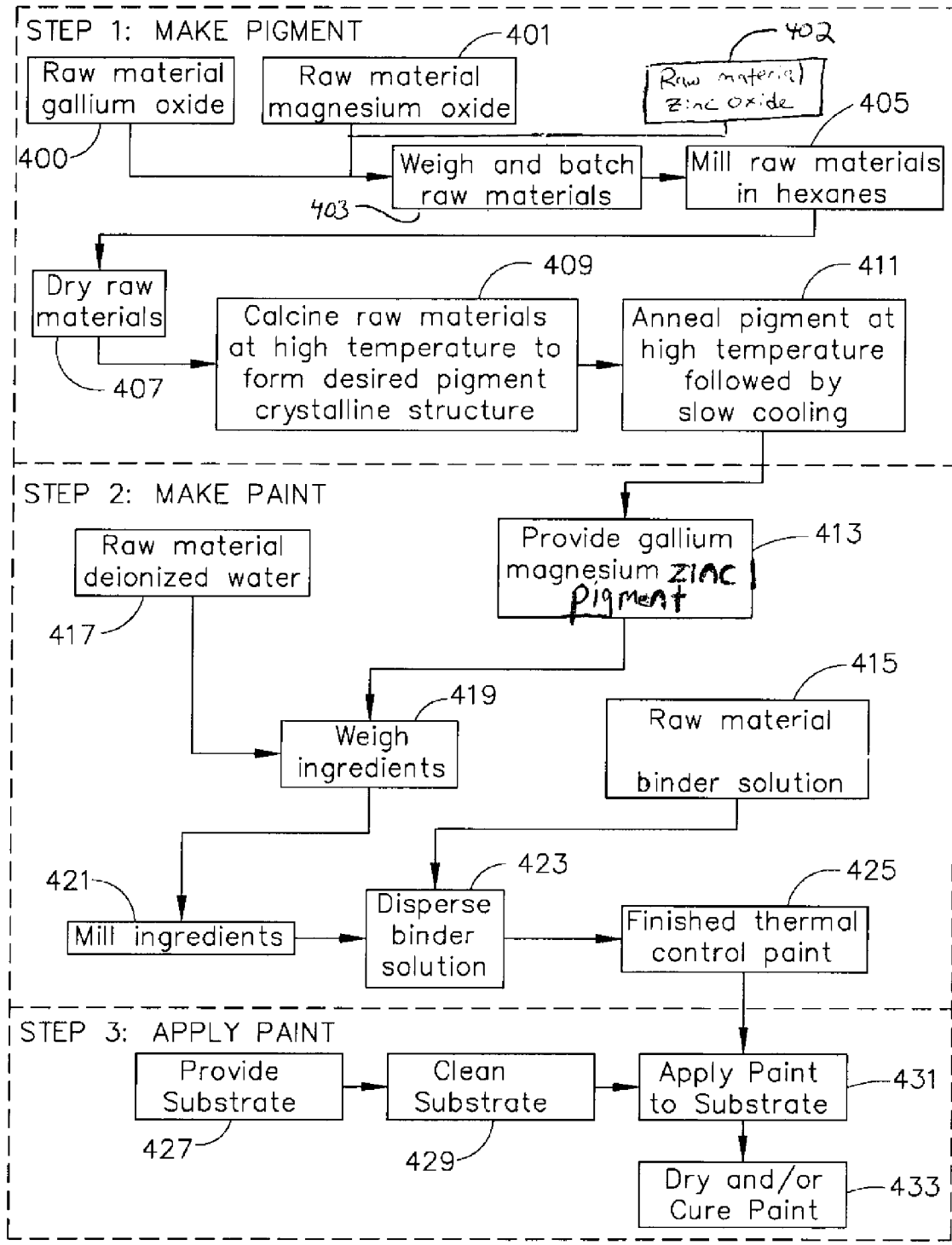
FIG. 4 is a block diagram of a method for the preparation of a white paint according to the disclosure and the painting of a substrate.

FIG. 4 depicts one embodiment of a method for preparing particles 103 wherein the pigment particle composition is $(Mg_{1-x}Zn_x)Ga_{2+y}O_{4-\delta}$, where x is a value from about 0 to 1, y is a value from about 0 to 0.02 and δ is in the range of about 0 to about 0.01. The pigment is utilized in the paint material used in the paint layer 100, and for painting the substrate. As shown in FIG. 4, the method includes the steps of making the pigment, making the paint and applying the paint. In making the pigment, the raw materials (e.g., gallium oxide, magnesium oxide and zinc oxide) are provided, step 400, 401, 402 and weighed, step 403. As discussed above, the ratios of the components are weighed to provide the desired ratios with respect to stoichiometry. Specifically, certain embodiments include a stoichiometric excess of gallium oxide. The raw materials are milled together to form a mixture, step 405. The milling is accomplished in a milling medium. The milling medium may be a suitable organic carrier, such as hexane. After milling is complete, the mixing medium is removed by drying or otherwise volatilizing the mixing medium, step 407.

The dried mixture is fired (i.e., calcined) to chemically react the components together, step 409, at a temperature that in one embodiment is in the range of from about 1000° C. to about 1300° C. or from about 1050° C. to about 1300° C. Certain embodiments include a firing treatment from about 2 hours at higher temperature to about 24 hours at lower temperature. In one embodiment, the firing treatment takes place at a temperature of 1100° C. for six hours, in an atmosphere of from about 5 to about 30 vol % or about 10 vol % hydrogen with the balance argon or other inert gas. The mixture is thereafter optionally annealed, step 411, after the firing at a lower temperature, for example 1000° C. for several hours in an atmosphere of from about 5 to about 30 vol % or about 10 vol % hydrogen with balance argon or other inert gas. For example, the annealing may take place for from about 1 to 10 hours. In an alternate embodiment the method may include a slow cooling ramp-down, rather than annealing at a constant temperature. The optional annealing affects the degree of spinel disordering. The resultant mass is both aggregated and agglomerated.

The pigment formed is prepared for formulation of a paint. In order to make the paint the pigment from step 411 is provided, step 413. Water or other suitable vehicle is also provided, step 417. The pigment from step 413 and the vehicle from step 417 are weighed and batched, step 419. Thereafter the pigment and vehicle are milled together, step 421. The resultant particulates have a size range from about 5 micrometers to about 25 micrometers.

Subsequent to milling, binder material is dispersed into the milled, particulate solution, step 423. There may be some separation over extended periods of time, but the paint is normally stirred or agitated just before or at the time of application. A binder is provided, step 415, to adhere the particles together in the final product. The binder is selected to provide good adherence of the particles to each other and of the particles to the underlying substrate, with acceptable physical properties. The binder must withstand the environment to which the paint is exposed, such as a space environment. The binder is present in an operable amount. In a typical case, the binder is present in an amount such that the ratio, by weight, of the total of all of the particulates to the binder is about 4:1 or less. If the ratio is more than about 4:1, the critical pigment volume concentration (CPVC) may be exceeded, the paint has insufficient mechanical strength, and the paint falls apart when dried. In one embodiment, the ratio by weight of particles to binder is from about 3:1 to about 4:1 or from about 2.5:1 to about 4.0:1. The preparation of the paint is complete, step 425.

Returning to FIG. 4, the paint is used by providing the substrate 201 to be coated (see FIG. 2), step 427, and cleaning the substrate, numeral 429. The substrate 201 may be any suitable substrate capable of receiving the coating. There is no known limitation on the type of substrate. The surface of the substrate is cleaned by any operable technique, such as washing and scouring in a detergent solution, rinsing in tap water, rinsing in de-ionized water, and drying in air. The paint is applied to the surface of the substrate, step 431. At the outset of the application, the surface of the substrate may be primed to improve the adhesion of the paint. Priming is preferred for application of the paint containing an inorganic binder to metallic surfaces, such as aluminum. Preferably, the priming, if used, is accomplished by rubbing a small amount of the paint into the surface using a clean cloth, to achieve good contact to the surface.

The paint layer is thereafter applied by any operable technique, including, but not limited to spraying, rolling, or brushing.

As the liquid paint dries, curing of the binder occurs. The paint is cured, as necessary, to leave a thin film of a solid material, step 433. Curing may be accomplished at ambient temperature and ambient humidity within approximately 5 days. A 50 percent or greater humidity and for a time of about 14 days is one preferred schedule. Drying removes the paint vehicle by evaporation. Additionally, the drying step may accomplish a degree of curing of any curable components, as where a curable inorganic binder is used. The paint layer is preferably from about 0.003 to about 0.006 inch in thickness or from about 0.003 to about 0.006 inch in thickness.

In addition to the described $(Mg_{1-x}Zn_x)Ga_{2+y}O_{4-\delta}$, wherein the value of x is a value from about 0 to 1 or from about 0.01 to about 0.75 or from about 0.45 to about 0.55, y is a value from about 0 to 0.04 or from about 0 to about 0.02 or from about 0 to about 0.01 and δ is in the range of about 0 to about 0.03 or from greater than 0 to about 0.01 or from greater than 0 to about 0.005, the material may contain active or inert components to modify the properties of the paint. For example, properties such as optical properties and/or the mechanical properties of the final material may be altered by adding additional active or inert components. In one embodiment, active secondary particles interact optically with incident energy, and may include, for example, aluminum-doped zinc oxide particles such as described in U.S. Pat. No. 5,094,693, which is incorporated herein by reference in its entirety. Such active secondary particles may be utilized to improve the low temperature electrical conductivity at the expense of optical properties, for particular applications. Inert secondary particles are those which serve primarily as filler to increase the volume fraction of particulate material present without greatly modifying the optical properties. The inert secondary particles may be added for economic reasons, as they are of lower cost than the pigment particles, and active secondary particles. Inert secondary particles can include, for example, barium sulfate, clay, or talc.

EXAMPLES

Example 1

A pigment having electrical conductivity is formed according to the process shown and described in FIG. 4. The pigment formed includes the following formula:

$$(Mg_{0.50}Zn_{0.50})Ga_2O_{4-\delta} \text{ (Mg=50\% and Zn=50\%)}$$

The resultant value of δ for this example is from about 0.015 to about 0.054. The composition formed was confirmed to have a spinel structure with less than 1 wt % excess gallium oxide. The pigment is incorporated into a potassium silicate binder and formed into a thermal paint having electrical conductivity.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An electrostatic dissipative paint comprising:
   a pigment, the pigment comprising a composition according to the following formula:

$$(Mg_{1-x}Zn_x)Ga_{2+y}O_{4-\delta};$$

wherein the value of x is a value from greater than 0 to less than 1, y is a value from greater than 0 to 0.04 and δ is in the range of greater than 0 to about 0.03.

2. The paint of claim 1, wherein the value of x is a value from about 0.01 to about 0.75.

3. The paint of claim 1, wherein the binder is potassium silicate.

4. The paint of claim 1, wherein the binder is selected from the group consisting of potassium silicate, sodium-potassium silicate, lithium-potassium silicate, lithium-sodium silicate and combinations thereof.

5. An electrostatic dissipative coating system comprising:
   a cured binder;
   a plurality of particles incorporated into the binder having a composition according to the following formula:

$$(Mg_{1-x}Zn_x)Ga_{2+y}O_{4-\delta};$$

wherein the value of x is a value from greater than 0 to less than 1, y is a value from greater than 0 to 0.04 and δ is in the range of greater than 0 to about 0.03.

6. The coating system of claim 5, wherein the value of x is a value from about 0.01 to about 0.75.

7. The coating system of claim 5, wherein the binder is selected from the group consisting of potassium silicate, sodium-potassium silicate, lithium-potassium silicate, lithium-sodium silicate and combinations thereof.

8. The coating system of claim 5, wherein the cured inorganic binder having the particles incorporated therein is electrically conductive.

9. The coating system of claim 5, wherein the coating system further includes the cured inorganic binder disposed on a substrate.

10. The coating system of claim 9, wherein the substrate includes a spacecraft component.

11. The coating system of claim 10, wherein the spacecraft component includes a satellite.

12. A method for making a thermal paint comprising:
    providing gallium oxide powder;
    providing a magnesium oxide powder;
    providing a zinc oxide powder;
    mixing the gallium oxide powder, the magnesium oxide powder and the zinc oxide powder;
    calcining the mixture at an elevated temperature for a sufficient time to produce a pigment having the spinel structure having the following formula:

$(Mg_{1-x},Zn_x)Ga_{2+y}O_{4-\delta}$;

wherein the value of x is a value from greater than 0 to less than 1, y is a value from greater than 0 to 0.04 and δ is in the range of greater than 0 to about 0.03;

optionally annealing the calcined powder at an elevated temperature in an atmosphere of 5-30 vol % hydrogen with balance inert gas; and incorporating the pigment into a binder to form a paint.

13. The method of claim 12, wherein the binder is selected from the group consisting of potassium silicate, sodium-potassium silicate, lithium-potassium silicate, lithium-sodium silicate and combinations thereof.

14. The method of claim 12, wherein the value of x is a value from about 0.01 to about 0.75.

15. A method for protecting a spacecraft:
comprising providing a spacecraft component; and
applying a coating to a surface of the component, the coating containing a pigment comprising a composition according to the following formula:

$(Mg_{1-x},Zn_x)Ga_{2+y}O_{4-\delta}$;

wherein the value of x is a value from greater than 0 to less than 1, y is a value from greater than 0 to 0.04 and δ is in the range of greater than 0 to about 0.03.

16. The method of claim 15, herein the binder is selected from the group consisting of potassium silicate, sodium-potassium silicate, lithium-potassium silicate, lithium-sodium silicate and combinations thereof.

17. The method of claim 15, wherein the value of x is a value from about 0.01 to about 0.75.

18. The method of claim 15, wherein the applying comprises spraying, rolling, or brushing.

19. The method of claim 15, wherein the spacecraft component is a satellite.

* * * * *